United States Statutory Invention Registration [19]

[11] Reg. Number: H880

Patin [43] Published: Jan. 1, 1991

[54] IN-PLANE TRANSMISSION LINE CROSSOVER

[75] Inventor: Robert J. Patin, Hawthorne, Calif.

[73] Assignee: The United States of America as represented by the Secretary of the Air Force, Washington, D.C.

[21] Appl. No.: 320,871

[22] Filed: Feb. 28, 1989

Related U.S. Application Data

[63] Continuation-in-part of Ser. No. 83,127, Aug. 10, 1987, abandoned.

[51] Int. Cl.[5] ..... H01P 3/08; H01P 5/12

[52] U.S. Cl. ..... 333/116; 333/109; 333/117; 333/120; 333/125; 333/246

[58] Field of Search ..... 333/116, 120, 123, 125, 333/109, 117, 246, 115

[56] References Cited

U.S. PATENT DOCUMENTS

| | | | |
|---|---|---|---|
| 2,831,168 | 4/1958 | Smoll | 333/120 |
| 3,066,264 | 11/1962 | Goetter | 333/120 X |
| 3,346,823 | 10/1967 | Maurer et al. | 333/117 |
| 3,621,400 | 11/1971 | Paciorek | 333/117 X |
| 3,626,332 | 12/1971 | Barbatoe | 333/116 |
| 3,659,227 | 4/1972 | Whistler | 333/109 X |
| 3,731,217 | 5/1973 | Gerst et al. | 333/117 X |
| 3,737,810 | 6/1973 | Shelton | 333/116 |
| 3,772,616 | 11/1973 | Imoto | 333/116 X |
| 4,127,831 | 11/1978 | Riblet | 333/116 X |
| 4,389,594 | 6/1983 | Conciauro et al. | 333/109 X |
| 4,517,535 | 5/1985 | Pon | 333/116 X |

FOREIGN PATENT DOCUMENTS

| | | | |
|---|---|---|---|
| 0043654 | 4/1979 | Japan | 333/116 |

*Primary Examiner*—Thomas H. Tacza
*Assistant Examiner*—Linda J. Wallace
*Attorney, Agent, or Firm*—Donald J. Singer; Bernard E. Franz

[57] ABSTRACT

A crossover for microwave electromagnetic radiation is constructed in a planar configuration for the transference of all of the power of a wave in a first transmission line to a wave in a second transmission line. The crossover is formed of two pairs of cross arms wherein, in each pair, the arms are spaced apart by an electrical length of ninety degrees along the first and the second transmission lines, and couple power of the waves between the first and second transmission lines with an introduction of a quarature phase relationship. The impedance presented to a wave of a cross arm is less than the corresponding impedance of the first and the second transmission lines by a factor of the square root of two to inhibit the generation of relections at junctions between a cross arm and the first or the second transmission line. Each junction provides for a diversion of one-half the power of the wave from the first or the second transmission line to a cross arm.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

IN-PLANE TRANSMISSION LINE CROSSOVER

This invention was made with government support under Contract No. F04701-85-C-0067 awarded by the Air Force. The government has certain rights in this invention.

This application is a continuation-in-part of application Ser. No. 07/083,127, filed Aug. 10, 1987, now abandoned.

BACKGROUND OF THE INVENTION

Microwave circuits are employed for coupling electromagnetic energy between microwave components such as radiating elements including apertures, horns, circulators, signal generators and receivers. The conduits by which the electromagnetic energy is coupled between the microwave components may be constructed in various forms of transmission lines ranging from stripline and microstrip to waveguide, and frequently include various forms of power couplers, power splitters, and power combiners. Such conduits allow microwave signals to be split among a number of microwave components, and also allow the combining of signals from a plurality of microwave components.

Of particular interest herein are complex microwave circuits employing transmission lines comprising two electrical conductors for interconnecting numerous microwave components. Such circuitry is found, by way of example, in large antenna arrays employing many horn radiators, slotted arrays, and in-plane radiators coupled by signal combiners and or splitters to produce a desired radiation pattern. A Butler matrix is an example of such microwave circuitry. Typical two-conductor transmission lines are microstrip and coaxial transmission lines. In such complex microwave structures, it is frequently necessary to bring signals from various parts of the structure to other parts of the structure by waveguide paths which cross over each other. Such crossings of signals have been accomplished by bending one coaxial line about another, or by providing a multiple layer microstrip structure for passing one transmission line about another.

A problem arises in that the physical complexity and size of a microwave structure is increased by signal crossovers employing a passage of one coaxial cable or microstrip transmission line waveguide about another. It is recognized that the most simple form of such structure is attained by placing all components and connecting transmission lines in a single plane. However, heretofore, such a simplified structure has not been attainable because a multiplicity of crossover structures comprising bent coaxial lines and/or undulating microstrip lines can produce a considerable amount of stacking of the transmission lines, one above the other. Such a mechanical configuration is both bulky and heavy. Excessive bulk and weight are characterics which are to be avoided in the construction of antenna arrays, such as those employed in satellites, wherein a reduction in space and weight is most desirable.

SUMMARY OF THE INVENTION

The foregoing problem is overcome and other advantages are provided by a two-conductor transmission-line crossover which, in accordance with the invention, can be constructed without necessitating any increased height to the crossover structure as compared to the height of the transmission-line, thereby to allow the microwave circuit to be constructed completely in a planar microwave structure. In addition, the transmission line crossover of the invention retains the impedance and signal power capacity of the transmission-lines, and can be accomplished without introducing complex impedance-matching circuitry.

In accordance with the invention, the two-conductor transmission-line crossover is employed with two parallel transmission-line branches, each of which may be, by way of example, microstrip or coaxial line. With respects to coaxial line, a coaxial line having a square cross section is of particular interest. The crossover comprises two-branch line couplers which are arranged serially along the two parallel branches and include cross arms which interconnect the two branches to accomplish a transfer of electromagnetic power from one branch to the other branch.

Each of the branch-line couplers, in a preferred embodiment of the invention, has a square shape and is formed of four arms, wherein two of the arms are cross arms extending between and electrically connecting the two branches. The remaining two arms in each coupler comprise sections of the branches, which sections serve as side arms of the couplers. In each coupler, the four arms are of equal electrical length in a preferred embodiment of the invention, this length being equal to one-quarter wavelength of electromagnetic waves propagating along the transmission-line. Also, electromagnetic power incident along one of the branches to an input port on one of the couplers divides equally between a side arm and a cross arm.

With the foregoing relationship, a component of the wave which travels in a branch-line coupler from an input port along a side arm through a cross arm and back through the second side arm to a second input port of the coupler would be 180 degress out of phase with a second component of the wave which travels along the remaining cross arm to the other input port. Thereby, no power which enters a first of the input ports exits from the second input port. However, two components of the wave entering an input port of the coupler at a first branch and traveling in alternate paths around the coupler towards an exit port in the opposite corner of the coupler at the second branch are in phase to provide for a transmission of power from one corner of the coupler to the diagonally opposite corner of the coupler. Also, a portion of the power inputted at a port of the coupler on one of the branches exits from a port of the coupler on the same branch. If desired, in lieu of the foregoing electrical length of one-quarter wavelength in each of the arms of the coupler, the coupler may be constructed with other electrical lengths which total algebraically to provide the foregoing relationship of phase shifts at the various junctions between the arms of the coupler, which junctions are located at the corners of the coupler.

By employing two of the couplers in series, the phasing of the various wave components and the fractions of the power coupled in each of the components provide for a resulting wave of electromagnetic power wherein all of the power is coupled from an input port on one branch of the crossover to an output port on the opposite branch of the crossover. Thereby, two microwave signals propagating along the first and the second branches are made to cross their paths without the introduction of a bulky crossover structure and without any degradation of signal-carrying characteristics of the waveguides, all the paths lying in a common plane.

BRIEF DESCRIPTION OF THE DRAWINGS

The forementioned features and other aspects of the invention are explained in the following description taken in connection with the accompanying drawings wherein.

DETAILED DESCRIPTION

Figure 1:
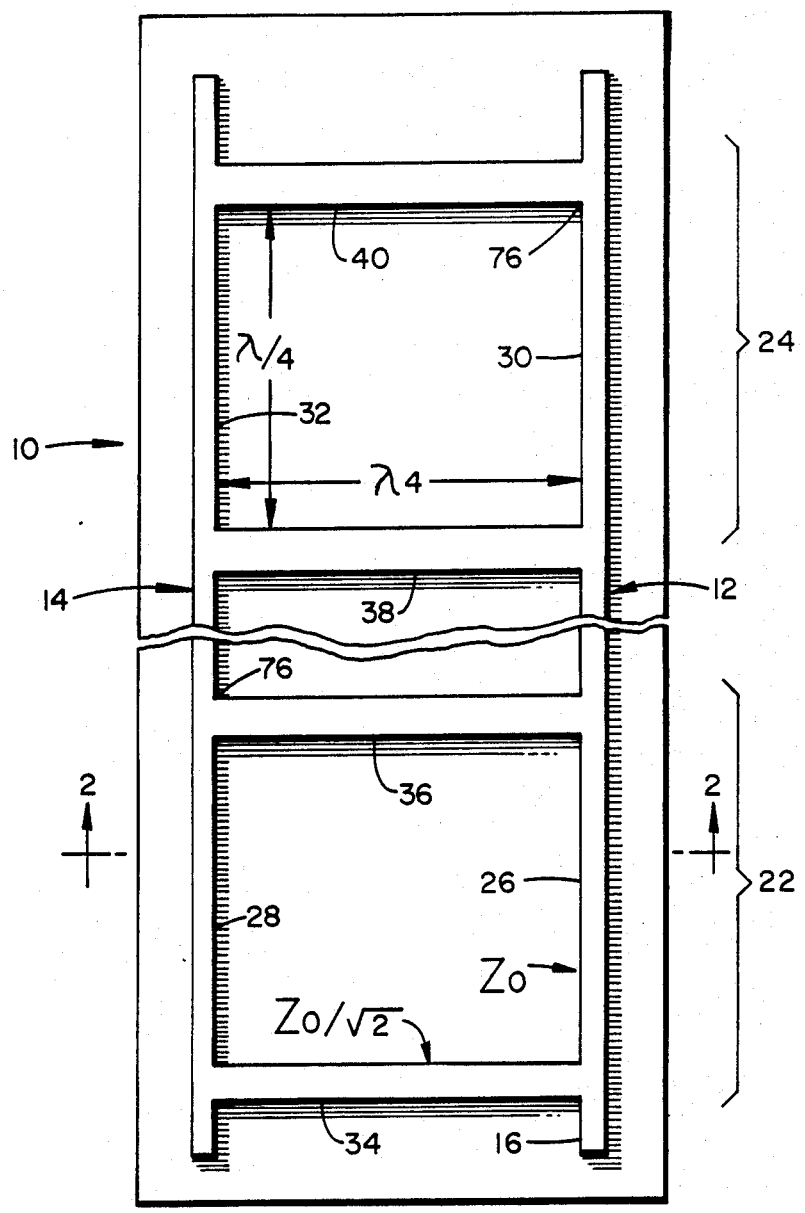
FIG. 1 is a plan view of a first embodiment of the crossover of the invention, this embodiment employing in microstrip transmission lines.
Figure 2:
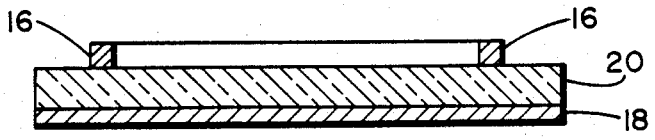
FIG. 2 is a sectional view of the cross over taken along the line 2—2 of FIG. 1.

With reference to FIGS. 1 and 2, there is shown a first embodiment of a crossover 10 for transferring power carried by waves, such as microwave electromagnetic radiation, between a right branch 12 and a left branch 14 wherein both of the branches 12 and 14 are transmission lines suitable for carrying electromagnetic waves. The transmission lines comprise two conductors arranged in the configuration of a microstrip transmission line. One of the conductors is formed as a strip conductor 16, and the other conductor is formed as a ground-plane conductor 18. The two conductors 16 and 18 are supported by a substrate 20 disposed between the two conductors 16 and 18. The substrate 20 is constructed of an electrically insulating material such as a blend of fiberglass and epoxy to insulate the strip conductor 16 from the ground-plane conductor 18. The conductors 16 and 18 are constructed of a metal such as copper foil.

The right branch 12 and the left branch 14 are electrically connected by a first branch-line coupler 22 and a second branch-line coupler 24 which are arranged serially, one behind the other, and are joined together by the branches 12 and 14.

In the first coupler 22, a section of the right branch 12 serves as a side arm 26, and a section of the left branch 14 serves as a side arm 28. Similarly, in the second coupler 24, a section of the right branch 12 serves as a side arm 30, and a section of the left branch 14 serves as a side arm 32. The first coupler 22 further comprises a front cross arm 34 and a back cross arm 36. Similarly, the second coupler 24 comprises a front cross arm 38 and a back cross arm 40. Each of the cross arms 34, 36, 38 and 40 are configured with the same microstrip construction as are the branches 12 and 14.

In operation, a section of strip conductor 16 is spaced apart uniformly from the ground-plane conductor 18 to support the propagation of an electromagnetic wave wherein an electric field is directed perpendicularly to the conductors 16 and 18 and extends between the conductors 16 and 18. This is in accordance with well-known theory of transmission of electromagnetic waves along a two-conductor transmission line.

Figure 3:
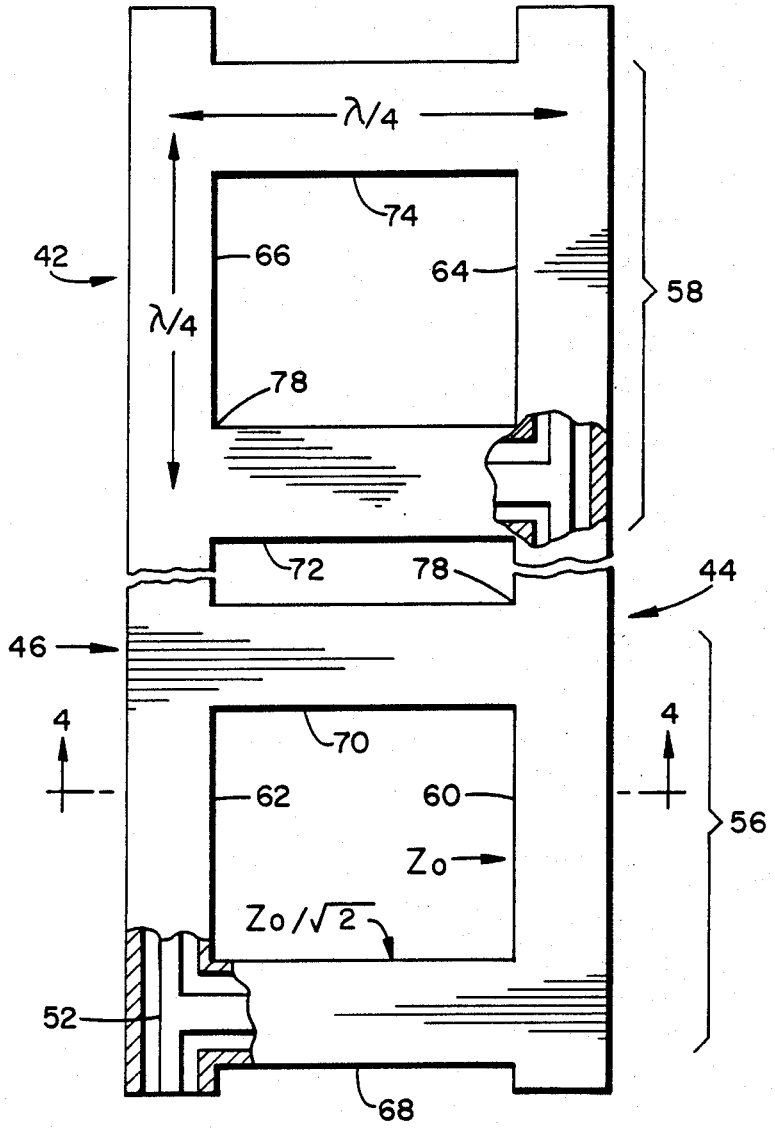
FIG. 3 is a plan view of a second embodiment of the crossover of the invention, this embodiment being constructed of coaxial transmission lines having a square cross section.
Figure 4:
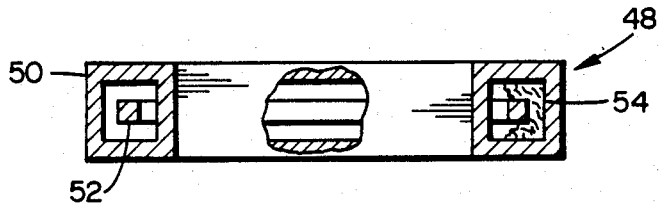
FIG. 4 is a sectional view of the crossover taken along line 4—4 in FIG. 3.

With reference to FIGS. 3 and 4, there is shown a second embodiment of the crossover of the invention, the second embodiment of the crossover beam being shown generally at 42. The crossover 42 is composed of a transmission-line structure having the same overall configuration as the transmission-line structure of the crossover 10. The crossover 42 provides for a transfer of power of electromagnetic waves between a right branch 44 and a left branch 46, both of which branches are transmission lines constructed of coaxial lines 48 of rectangular, preferably square cross-sectional shape. The coaxial line 48 has an outer conductor 50 of square cross-sectional shape and an inner conductor 52 of square cross-sectional shape disposed centrally within the outer conductor 50. The overall geometric configuration of the inner conductor 52, as is shown with the aid of cut away portions of the outer conductor 50 in the FIG. 4, is the same as that of the strip conductor 16 in FIG. 1, both configurations comprising side arms and cross arms which are disposed in a common plane. In the crossover 10 of FIGS. 1 and 2, a planar support for the transmission lines is provided by the substrate 20. In the crossover 42 of FIGS. 3 and 4, no such planar supporting substrate is required because of the coaxial form of the transmission lines, the configuration of the outer conductor 50 and the inner conductor 52 having adequate physical strength to maintain the configuration. Also included within the transmission lines of the crossover 42 is an insulating dielectric support 54 disposed in the space between the outer conductor 50 and the inner conductor 52 for holding the inner conductor 52 in its position within the outer conductor 50. Such dielectric support is well-known and has been deleted in FIG. 3 in the interest of clarity, a portion of the dielectric support being shown in FIG. 4.

The crossover 42 is composed of a first branch-line coupler 56 and a second branch line coupler 58 which are serially connected by the right branch 44 and the left branch 46. In the first branch-line coupler 56, a section of the right branch 44 serves as a side arm 60, and a section of the left branch 46 serves as a side arm 62. In the second branch-line coupler 58, a section of the right branch 44 serves as a side arm 64, and a section of the left branch 46 serves as a side arm 66. The first coupler 56 further comprises a front cross arm 68 and a back cross arm 70. The second coupler 58 further comprises a front cross arm 72 and a back cross arm 74. In both of the couplers 56 and 58, all of the side arms and all of the cross arms are formed of transmission lines having the form of the aforementioned coaxial line 48.

In the crossover 10 of FIG. 1, the two branches 12 and 14 are parallel to each other and are joined by the cross arms 34, 36, 38 and 40 by T junctions 76, the junction 76 providing for a diversion of one half of the power of a wave propagating along a branch, such as the right branch 12, into a side arm, such as the side arm 36. Similarly, in the crossover 42 of FIG. 3, the branches 44 and 46 are parallel and are joined by the cross arms 68, 70, 72 and 74 by T junctions 78 which provide for a diversion of one half of the power from a wave propagating along a branch, such as the right branch 44, to a cross arm such as the cross arm 40. In both the crossover 10 and the crossover 42, the impedance presented to an electromagnetic wave by a cross arm differs from that of a side arm, so as to minimize reflections of the waves at the junctions 76 and 78 respectively. In the case of the microstrip construction of the microstrip 10, the impedance of the cross arms is reduced from that of the side arms by enlarging widths of the cross arms relative to the widths of the side arms. As is well-known in the construction of microstrip, a widening of a strip conductor 16 results in a reduction of the impedance of the transmission line. Similarly, in the crossover 42, interior cross-sectional dimensions of the coaxial line 48 of the cross arms are enlarged to reduce the impedance of the cross arms relative to the side arms.

The operations of both embodiments of the invention, namely, the crossovers 10 and 42, are the same and will now be described with reference to FIG. 5. To facilitate an explanation of the operation, the explanation will be directed to the embodiment of FIG. 1, its being understood that the explanation applies equally to the embodiment of FIG. 3.

Figure 5:
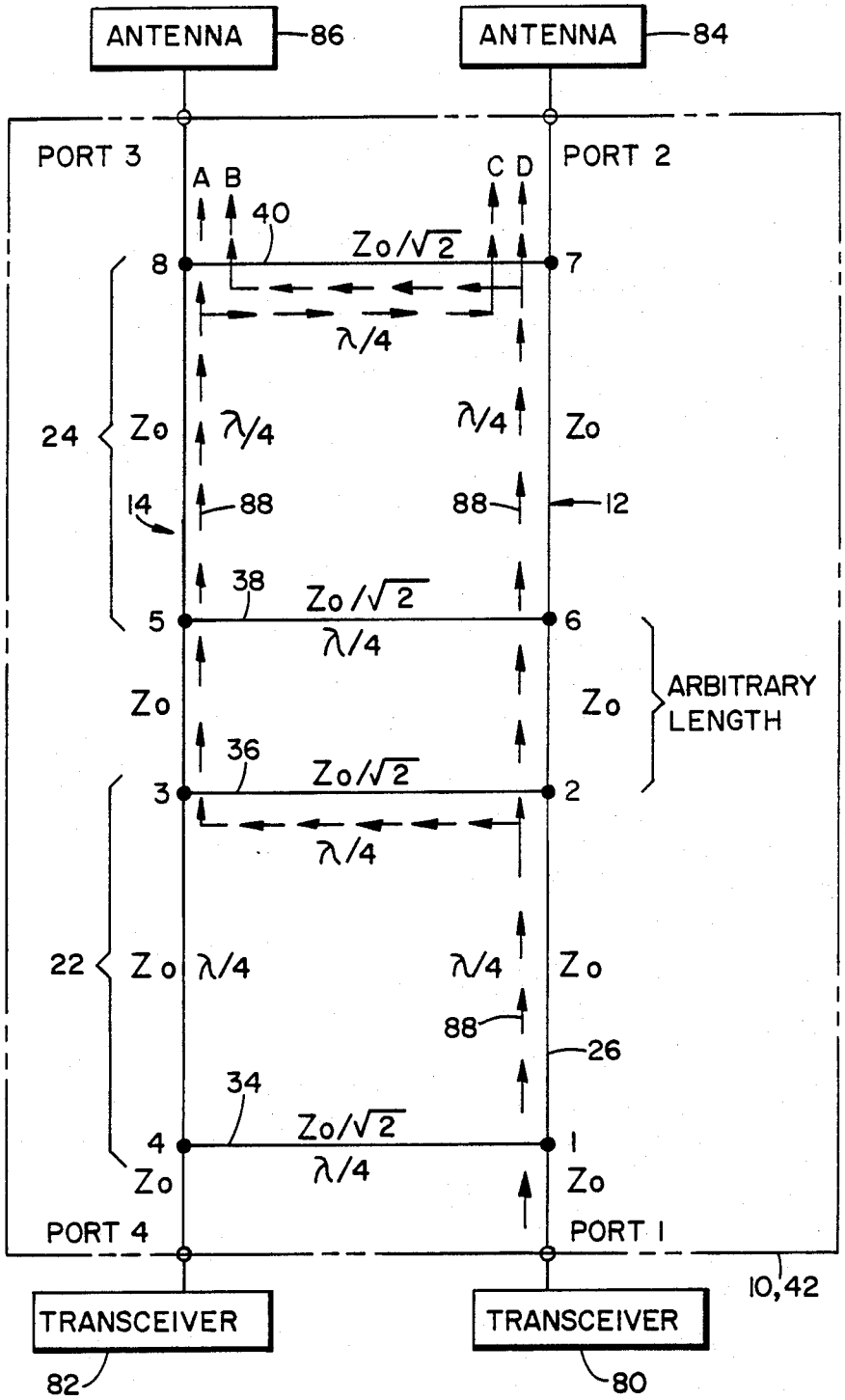
FIG. 5 is a schematic diagram useful in explaining the operations of the crossovers of FIGS. 1 and 3.

As shown in FIG. 5, the crossover 10 has four ports of which the first and the second ports are located at ends of the right branch 12, and the third and the fourth ports are located at ends of the left branch 14. The junctions 76 in FIG. 1 are shown as nodes in the schematic representation of FIG. 5, there being four of the nodes numbered 1, 2, 3, and 4 in the first branch-line coupler 22 and four nodes numbered 5, 6, 7 and 8 in the second branch-line coupler 24. By way of example in the use of the coupler 10, there are shown two transceivers 80 and 82 coupled to the first and the fourth port, respectively, and two antennas 84 and 86 coupled to the second and the third ports. At the frequency of operation, an electromagnetic signal emanating at the transceiver 80 enters the first port and exits the third port to be radiated from the antenna 86. A signal incident upon the antenna 86 enters the third port and exits the first port to be received by the transceiver 80. Similarly, signals are coupled in crossover fashion between the transceiver 82 and the antenna 84 via the second port and the fourth port. The transmission-line impedance at each of the ports is shown as Zo. Each of the branch-line couplers 22 and 24 is a three dB (decibel) coupler. In FIG. 5, a sequence of arrows 88 shows a flow of power from the first node via the side arm 26 to other portions of the crossover 10.

Due to the electromagnetic path lengths of the various side arms and cross arms, power does not flow to adjacent ports, for example, from the first port to the fourth port. This is readily understood by inspection of FIG. 5 wherein the path length from the first node to the fourth node via the second and the third nodes is three quarters of a wavelength while the path length directly from the first node to the fourth node is one quarter of a wavelength. Electromagnetic waves propagating along both of these paths from the first node to the fourth node are 180 degrees of phase; therefore, no power exits at the fourth port.

The same reasoning is applicable to the fifth and sixth nodes. They are mutually isolated from each other.

By way of further example, it is assumed that an electromagnetic wave input at the first port has a power of 10 watts and a phase of zero degrees. Reference will be made to relative phase only, rather than absolute phase. At the second node, the power is divided into two equal parts, with one of the waves lagging the other wave by 90 degrees phase shift at the third node. At the sixth node, the wave is carrying a power of 5 watts at a phase shift of zero degrees. At the fifth node the wave is carrying a power of 5 watts at a phase shift of minus 90 degrees.

The power in the waves is further divided at the seventh node and at the eight node, the division being into two equal parts with the introduction of a lagging phase shift of 90 degrees. This results in four output components of the electromagnetic waves, labelled A, B, C and D, the components A and B being outputted at the third port and the components C and D being output at the second port. From node 6, there is produced the output component D with a power of 2.5 watts at zero degrees. Also, from node 6 there is produced the output component B with a power of 2.5 watts and a phase shift of minus 90 degrees. From the fifth node there is provided the component A with a power of 2.5 watts and a phase shift of minus 90 degrees. Also, from the fifth node there is provided the component C with a power of 2.5 watts and phase shift of minus 180 degrees.

It is noted that these four components have the same power. However, while the components A and B have the same phase, the components C and D are 180 degrees out of phase, and cancel so that no power is outputted from the second port. Therefore, the power at the eighth node does not couple to the seventh node, but, instead, continues to the third port, and the power at the seventh node couples completely to the third port. As a result, the power of component A is doubled and the power of component B is doubled resulting in an outputting of the entire 10 watts at the third port at a phase shift of minus 90 degrees. The same relationship exists between power flow between the second and fourth ports. Thereby, the crossover 10, as well as the crossover 42, functions to transfer power between opposite corners of the crossover. In accordance with the invention, this crossover of power has been accomplished with a transmission line structure wherein all the side arms and the cross arms are disposed in a common plane.

By way of further example in the use of the crossover as depicted in FIG. 5, it is noted that if the frequency of the electromagnetic waves were doubled, then the amount of phase shift contributed by the arms in each of the couplers 22 and 24 would be doubled. In such case, the summations of various wave components in the arms of the couplers would provide for a power transfer between the first port and the second port, and between the fourth port and the third port. In this way, the crossover 10 or 42 can be employed in two separate modes of operation depending on the frequency of the electromagnetic waves. Thus, in one frequency band, radiant energy would be coupled between the antenna 84 and the transceiver 80, while in the other transmission band, radiation would be coupled between the antenna 86 and the transceiver 80.

The value of the impedance in each of the cross arms 34, 36, 38 and 40 is less than the value of the impedance in the branches 12 and 14 by a factor of the square root of 2. This difference in impedance provides for the desired division of power with minimal reflection of electromagnetic waves at each of the junctions 76 (FIG. 1). As noted above, this reduction in the impedance of the cross arms is accomplished by enlarging the widths of the cross arms relative to the widths of the branches 12 and 14 as is depicted in FIG. 1. Also, in the crossover 42 of FIG. 4, the cross-sectional dimensions of the cross arms 68, 70, 72 and 74 have also been enlarged relative to the cross-sectional dimensions of the branches 44 and 46 to provide for the foregoing reduction in the impedance of the cross arms relative to the branches 44 and 46.

Therefore, similar constructional features are applied to the transmission lines of both embodiments of the invention to allow the construction of a crossover structure in a planar configuration. The lengths of the branch lines 12 and 14 which interconnect the two couplers 22 and 24 may have any arbitrary length which may be greater than or less than one fourth of the wavelength of the electromagnetic waves propagating therethrough, to provide a phase shift which may be greater than or less than ninety degrees. As long as the interconnecting length of the right branch between the second and the sixth node is equal to the electrical length of the left branch between the third and the fifth nodes, the foregoing theory of operation applies.

It is to be understood that the above described embodiments of the invention are illustrative only, and that modifications therein may occur to those skilled in the art. Accordingly, this invention is not to be regarded as limited to the embodiments disclosed herein, but is to be limited only as defined by the appended claims.

What is claimed is:

1. A two-conductor transmission-line crossover comprising:

a set of two-wire transmission-line branches for transmitting electromagnetic energy;

a first branch-line coupler and a second branch-line coupler serially connected together by said set of branches;

each of said couplers comprising two side arms and two cross arms, the two side arms being of equal electrical length and the two cross arms being of equal electrical length, each of said side arms and each of said cross arms being configured as a two-conductor transmission-line, said side arms being formed of sections of said branches and being connected together by said cross arms, each of said cross arms introducing a 90 degree phase shift to electromagnetic waves propagating therethrough, each of said side arms introducing a 90 degree phase shaft to electromagnetic waves propagating therethrough, said cross arms being joined to ends of said side arms at junctions in said branches; and wherein said set of branches includes a first branch and a second branch separated by an arbitrary length, each of said branch-line couplers transfers half of the power of an electromagnetic wave from one of said branches to the other of said branches with a quadrature phase shift resulting in a crossover transmission of all the electromagnetic power from one of said branches to the other of said branches by a serial connection of said first branch-line coupler and said second branch-line coupler, all of said side arms and all of said cross arms being disposed along a common surface.

2. A two-conductor transmission-line crossover according to claim 1, wherein said arbitrary length separating said set of branches including a first branch and a second branch is an arbitrary length of greater than one fourth of the wavelength of the electromagnetic waves propagating therethrough.

3. A two-conductor transmission-line crossover according to claim 1, wherein said arbitrary length separating said set of branches including a first branch and a second branch is an arbitrary length of less than one fourth of the wavelength of the electromagnetic waves propagating therethrough.

4. A microwave crossover for transferring radiant energy from a first transmission line to a second transmission line, comprising:

a set of four cross arms spaced apart from each other, and arranged serially side-by-side along and coplanar with said transmission lines, each of said cross arms being configured as a transmission line and providing a connection between said first transmission line and said second transmission line, each of said cross arms introducing a phase shift of ninety degrees to radiant-energy waves of a predetermined frequency propagating between said first and second transmission lines; and wherein junctions are provided along said first and said second transmission lines for joining ends of said cross arms to said first and said second transmission lines;

a first arm and a second arm of said cross arms are spaced with a spacing which provides a ninety degree phase shaft along said first and second transmission lines between junctions thereof with said first and said second cross arms;

a third and a fourth arm of said cross arms are spaced apart with a spacing which provides a ninety degree phase shift along said first and said second transmission lines between junctions thereof with said third and said fourth cross arms;

said second and said third arm of said cross arms are spaced apart with a spacing or arbitrary length; and each of said junctions on said first transmission line provides a diversion of one-half the power in said first transmission line to a cross arm, the set of four cross arms providing for a complete transfer of power between said first and said second transmission lines.

5. A microwave crossover according to claim 4, wherein said second and said third arm of said cross arms are spaced apart with a spacing of arbitrary length which provides a phase shift of greater than ninety degrees along said first and said second transmission lines between junctions thereof with said second and said third cross arms.

6. A microwave crossover according to claim 4, wherein said second and said third arm of said cross arms are spaced apart with a spacing of arbitrary length which provides a phase shift of less than ninety degrees along said first and said second transmission lines between junctions thereof with said second and said third cross arms.

* * * * *